Patented Aug. 11, 1931

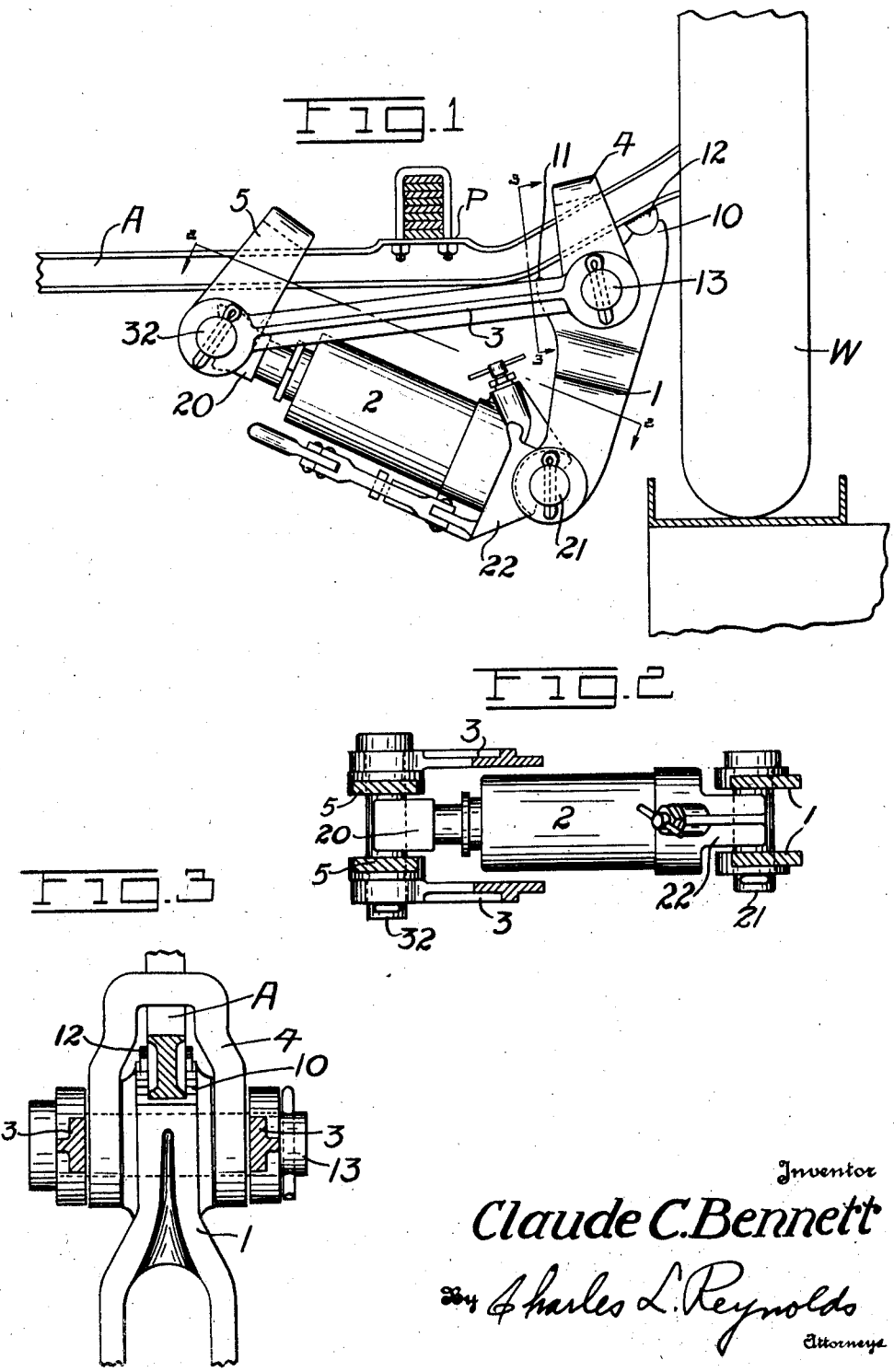

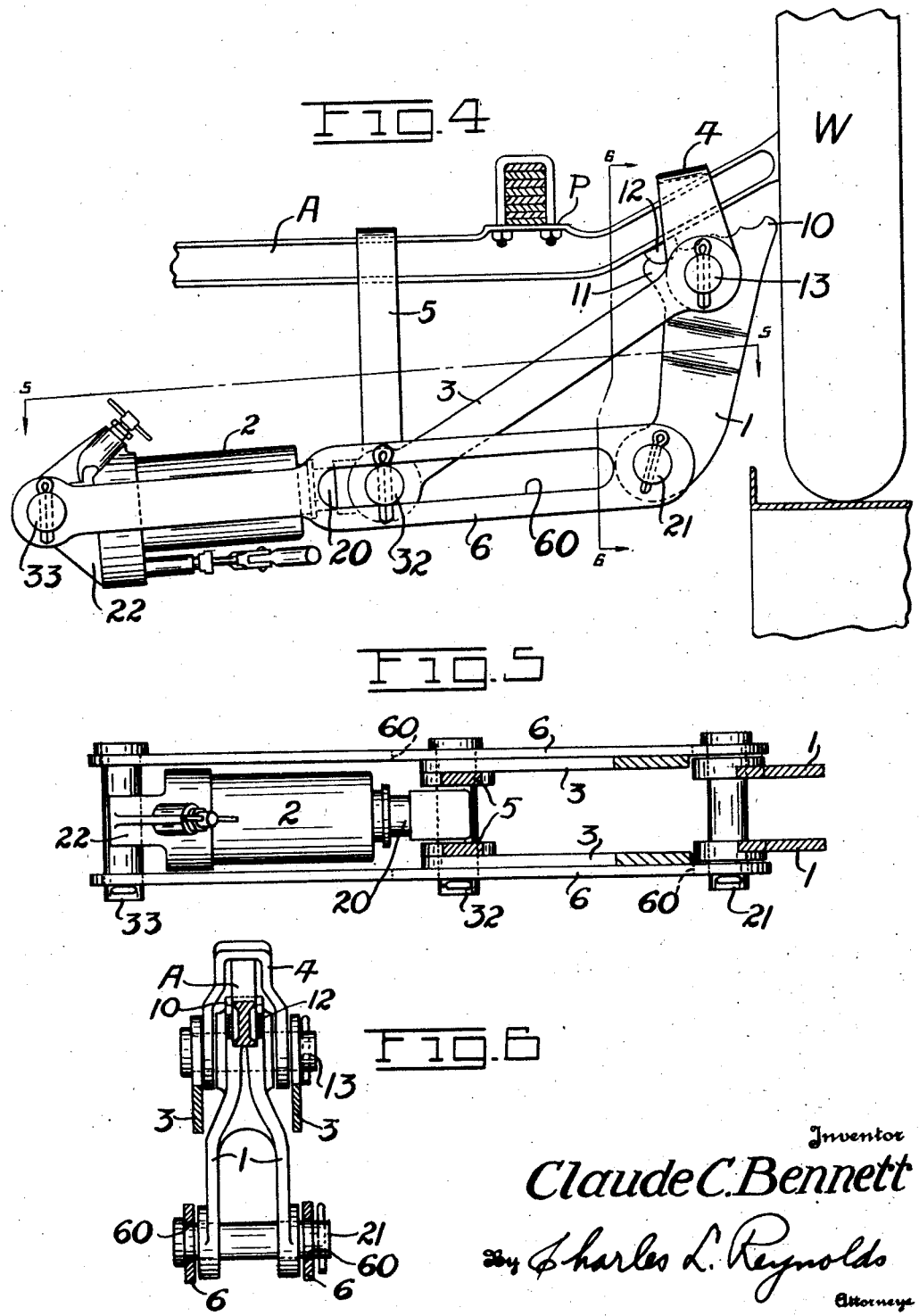

1,818,678

UNITED STATES PATENT OFFICE

CLAUDE C. BENNETT, OF SEATTLE, WASHINGTON, ASSIGNOR TO A. E. FERAGEN, INC., OF SEATTLE, WASHINGTON, A CORPORATION OF WASHINGTON

AXLE PRESS

Application filed January 28, 1930. Serial No. 423,927.

My invention relates to axle presses, and my particular object is to provide a press which may be used to bend any selected part of any automobile axle in any proper direction, usually up or down, to increase or decrease the camber of the wheel, as the case may be, and without the necessity of removing the wheels from the axle, or the axle from the car.

It is an especial object of this invention to provide a press of the general character indicated by means of which the axle may be bent outside of the spring perches, where it is bent only with considerable difficulty, without bending the axle at any other point, as the middle, where it is weak, and more easily bent.

More especially, it is an object to provide an axle press of this character which may be used in garages by the help usually available,—that is to say, by persons not especially skilled in the use of this particular instrument without danger of damage to the car and with wholly satisfactory results.

It is also an object of my invention to provide an axle press of this general character which will be simple in construction and in operation, and which can be quickly put into place upon a car and removed therefrom.

Other objects, and more particularly such as pertain to structural details, will be determinable from a study of the attached drawings, of this specification and of the claims which terminate the same.

My invention comprises the novel parts, and the novel combination and arrangement thereof, as shown in the accompanying drawings, described in the specification, and as will be more particularly defined by the claims which terminate the same.

In the accompanying drawings I have shown my invention in forms which are now preferred by me, and which are adapted to different types of work, it being understood that my invention may take various forms, within the scope of the appended claims.

Figure 1 is a front elevation of my press attached to the front axle of a motor vehicle, and in position of use.

Figures 2 and 3 are transverse sections on the respective lines 2—2 and 3—3 of Figure 1.

Figure 4 is a front elevation similar to Figure 1 of a modified form of my press which may be found preferable for some types of work.

Figures 5 and 6 are transverse sections on the respective lines 5—5 and 6—6 of Figure 4.

Essentially, my invention comprises three members, 1, 2, and 3, which are pivotally connected together at the points 13, 21 and 32, in such manner as to permit a slight pivoting action of the members relative to each other. One of these members, as 2, is an expansible or compressible member, that is, a member which is adjustable in length, as the two relatively movable parts of a jack are adjustable; one of them, as 3, is a stress-transmitting member, either for tension or compression, and the third, the member 1, is a lever which has a short arm, 10 or 11, adapted to bear against an axle to be bent, preferably against the under side thereof. In order to apply the pressure to the axle, the triangular arrangement, described in general terms, must be secured to or suspended from the axle, and for this purpose I employ a clevis 4 which is adapted to fit over the axle and which receives the removable pin 13 by means of which the lever 1 is supported from the axle.

The entire triangular arrangement may be supported by this single clevis 4, but I prefer that a second support be used, and for this purpose may employ a clevis 5 likewise adapted to fit over the axle A, and to receive the removable pin 32, which is in effect a reaction member against which one of the parts of the jack 2 may bear. Thus, in Figure 1 I have shown the head of the piston or plunger 20 as bearing against the reaction pin 32, and the base 22 of the jack bears against the pin 21, so that as the plunger 20 is forced outwardly the member 3 is placed in tension, and the lower end of the lever 1 is caused to swing to the right, as seen in Figure 1, pushing the arm 10, or the removable hardened bearing block 12 seated therein, against the under side of the axle, outwardly of the engagement of the clevis 4 therewith. The effect of this, of course, will be to bend the axle upwardly outside of the clevis 4, and thus to decrease the camber of the wheel W. It has been found that this is a difficult operation with presses now in use, but it is most desirable to bend axles outside of the spring perches P for its is there that the greatest part of the bending should be done, so that the relationship of the springs to the axle and the chassis be not disturbed.

In Figure 4 the clevis 5 is shown as lengthened considerably, and instead of placing the jack 2 between the pins 32 and 21, as in Figure 1, an extension link 6 is employed, having a slot 60 within which is received the outer ends of the pin 32, and which has a pin 33 in its outer end, against which the base 22 of the jack bears, the plunger 20 of the jack bearing against the pin 32 which is supported by the clevis 5. In this arrangement extrusion of the plunger 20 forces the pins 32 and 21 together, and the stress-transmitting member 3 is compression. The effect of this is to press the short arm 11 of the lever 1, or the bearing block 12 thereof, against the under side of the axle inwardly of the engagement of the clevis 4 therewith, with the result that the axle is bent downwardly to increase the camber of the wheel W.

The entire device is made with removable pins so that they may be quickly put into place or removed to attach the axle press or to detach it from the axle. It is the work of but a few moments to attach it, to cause the plunger of the jack to be protruded, and to retract the jack and remove the axle press. During this time the wheel may be gauged by suitable gauging devices to determine when the camber has been brought to that desired.

It will be understood that there may be other means of supporting the triangular device, and that the same might, in effect, be a duplicate lever such as the lever 1 or a part thereof, such as is shown in my copending applications Serial Nos. 337,625 and 337,626 filed February 5, 1929. I prefer the present arrangement, however, since the clevis 5 is merely a support and there is no stress placed thereby on the axle inwardly of the spring perches, tending to bend the axle at the point where it is weakened. There is no stress on the axle inside of the spring perches other than the weight of pin 32 and associated parts. However, should it be desired to bend the axle between the perches, it can be done by reversing the device from the arrangement shown, causing the short arm 10 or 11 of the lever to bear at the point to be bent. It will be noted that two or more seats for the block 12 are provided, whereby the leverage can be varied.

What I claim as my invention is:

1. An axle press comprising, in combination, a jack, a lever having one arm adapted to bear against an axle to be bent, and to have its other arm engaged by one of the relatively movable parts of said jack, and a stress-transmitting member connecting the other relatively movable part of said jack and the pivot of said lever.

2. An axle press comprising, in combination, a lever having one arm adapted to bear against an axle to be bent, a jack engaging its opposite end, a reaction member with which said jack is likewise engaged, means for suspending the same from the axle, and a stress-transmitting member connecting said reaction member and the pivot of said lever.

3. An axle press comprising, in combination, three members pivotally connected each to the other in triangular form, one of said members being a lever bearing against and suspended from an axle to be bent, and another being a member longitudinally variable in length to swing said lever.

4. The combination of claim 3, and supplemental means spaced from the lever's support to further support the assembly from the axle.

5. An axle press comprising, in combination, a clevis adapted to be placed over an axle to be bent, a lever pivotally supported in said clevis and having an upper and a lower arm, its upper arm bearing against the axle, a jack, a pin supporting said jack at one end, the jack bearing at its other end against the lower arm of said lever, and link connecting said pin with the pivot of said lever.

6. An axle press comprising, in combination, a clevis adapted to be placed over an axle to be bent, a lever pivotally supported in said clevis and having an upper and a lower arm, its upper arm bearing against the axle, a jack, a pin supporting said jack at one end, the jack bearing at its other end against the lower arm of said lever, a link connecting said pin with the pivot of said lever, and a second clevis adapted to be placed over the axle and suspending said pin therefrom.

7. In an axle press, in combination, a lever pivotally supported near one end, means to support the lever, at its pivot, from an axle to be bent, with its short arm bearing thereagainst, a slotted link pivotally secured to the long arm of said lever, a pin supported from the axle and received in the slot of said link, and a jack bearing at one end on said link, outwardly of said pin, and at its other end against said pin.

8. The combination of claim 7, including a second link extending between the pin and the pivot of the lever.

9. In an axle press, in combination, a lever pivotally supported near one end, means to support the lever, at its pivot, from an axle to be bent, with its short arm bearing thereagainst, a pin spaced from the lever and supported from the axle, and a jack bearing at one end against said pin, and at its other end against the long arm of said lever.

10. Apparatus for bending an axle comprising a lever pivoted between its ends and having one arm adapted to bear beneath the axle to be bent, and to have its other arm engaged by one of the relatively movable parts of a jack, a reaction member also adapted for engagement by another part of the jack, a jack comprising two separable parts, one engaging the aforesaid arm of the bending lever, and the other engaging the reaction member, and operable to alter the amount of separation therebetween, and means for fixing the pivot of said lever to prevent its displacement relative to the axle when stress is applied to the lever.

11. Apparatus for bending an axle comprising a lever pivoted between its ends and having one arm adapted to bear beneath the axle to be bent, and to have its other arm engaged by one of the relatively movable parts of a jack, a reaction member also adapted for engagement by another part of the jack, a jack comprising two separable parts, one engaging the aforesaid arm of the bending lever, and the other engaging the reaction member, and operable to alter the amount of separation therebetween, and means associated with said reaction member for fixing the pivot of said lever to prevent its displacement relative to the axle when stress is applied to the lever.

12. In an axle press, a bending lever having two arms, one arm extending laterally from its pivot to bear beneath an axle to be bent, and the other arm depending from the pivot, means for suspending said lever by its pivot from the axle, a reaction member suspended from the axle, a bar extending between said latter member and the pivot of said lever, and a jack operatively connected to the reaction member and to the depending arm of the lever to change the spacing of the latter relative to the former.

13. A bending machine, embodying a bending lever arranged to bear beneath an axle to be bent, and bifurcated at its lower end, a cross pin extending between the sides of said lever, means to suspend said lever in operative position from the axle, a second cross pin independent of the lever and disposed at a distance from the first to constitute a reaction member, and a hydraulic jack having hooks at its opposite ends engageable with the respective cross pins to force against the first from the second.

14. A bending machine embodying a bending lever arranged to bear beneath an axle to be bent, and having trunnions projecting at each side, outwardly of the lever's fulcrum, means to suspend said lever in operative position from the axle, a cross pin independent of the lever and disposed at a distance from said trunnions to constitute a reaction member, a pair of slotted links pivoted by one end upon the trunnions and receiving said cross pin in the slots, and a jack member bearing against said cross pin and against the outer end of said links, to draw the trunnions and lever towards the cross pin.

Signed at Seattle, King County, State of Washington, this 22nd day of January, 1930.

CLAUDE C. BENNETT.